United States Patent [19]

Kimura et al.

[11] 3,945,027
[45] Mar. 16, 1976

[54] ROTARY SHUTTER MECHANISM

[75] Inventors: Shuji Kimura, Tokyo; Sachio Ohmori, Yokohama, both of Japan

[73] Assignee: Nippon Kogaku K.K., Tokyo, Japan

[22] Filed: Jan. 24, 1974

[21] Appl. No.: 436,171

[30] Foreign Application Priority Data

Jan. 26, 1973 Japan.............................. 48-10772
May 31, 1973 Japan.......................... 48-63371[U]

[52] U.S. Cl.............. 354/250; 354/253; 354/254; 354/261; 354/262
[51] Int. Cl.² .......................................... G03B 9/16
[58] Field of Search ........... 354/250, 251, 252, 253, 354/254, 255, 256, 257, 258, 259, 260, 261, 262, 263, 264, 265; 352/121, 214, 215

[56] References Cited
UNITED STATES PATENTS

| | | | |
|---|---|---|---|
| 2,274,707 | 3/1942 | Kende et al. | 354/262 |
| 2,537,905 | 1/1951 | Mihalyi | 354/262 |
| 3,272,107 | 9/1966 | Bloemendal | 354/254 |
| 3,425,330 | 2/1969 | Noack et al. | 354/253 |

Primary Examiner—L. T. Hix
Assistant Examiner—Russell E. Adams, Jr.
Attorney, Agent, or Firm—Fitzpatrick, Cella, Harper & Scinto

[57] ABSTRACT

A rotary shutter mechanism for use in a camera having a winding mechanism and a release mechanism includes a sector change-over mechanism which comprises a pair of substantially semicircular sectors mounted on respective drive shafts. One of these sectors which covers a picture-taking opening serves as a leading curtain and the other sector disposed 180° out of phase with respect to the first sector serves as a trailing curtain. These sectors are individually rotatable through 180° in one direction to effect a shutter operation. Thus, the sectors need not be returned to their original positions during each winding operation.

6 Claims, 7 Drawing Figures

ROTARY SHUTTER MECHANISM

BACKGROUND OF THE INVENTION

1. Field of the Invention

This invention relates to photographic equipment, and more particularly to a rotary shutter mechanism for use in still cameras.

2. Description of the Prior Art

The recent development of motor drive means has enabled continuous shooting to take place at a rate of three to five frames per second; however, it is now desired further to increase the rate of continuous shooting.

Conventional still cameras adapted for use with motor drive means have employed a shutter known as a focalplane shutter which comprises two shutter curtains reciprocally movable during exposure and during winding. The shutter curtains and the actuating system therefor contribute substantial inertial mass which in turn has led to a reduction in the ability of the mechanism to accelerate rapidly, thus providing a barrier to efforts to increase the speed of continuous shooting. To avoid these problems, the present invention incorporates the rotary shutter which has usually been used in cinecameras.

Generally, the following three types of rotary shutter systems have heretofore been proposed for use in still cameras.

A first type is the system disclosed in Japanese Patent Publication No. 22077/1964, of which the embodiment of FIG. 2 employs a single sector provided with an opening larger than the picture plane and rotatable to vary the time required for the opening to traverse the picture plane, thereby determining the shutter speed. According to such system, the sector opening must necessarily be larger than the picture plane in order to provide a bulb (B) shutter or a low-speed shutter.

Therefore, the rotational speed of the sector must be increased to provide a high-speed shutter, but the range of 1/125 to 1/250 sec. would be the maximum shutter speed of such shutter when considered for use in 35 mm still cameras.

A second type is the system disclosed in Japanese Utility Model Publication No. 29806/1969 which, in an effort to eliminate the drawbacks peculiar to the first type, uses a pair of sectors to form an opening which is variable in accordance with the shutter speed setting, the sectors being rotatable while maintaining a predetermined opening during shutter operation.

According to this system, the two sectors must partly overlap each other even for a minimum opening and thus, the composite inertial mass of the two sectors is equal to the inertial mass of a perfect disc having no opening, which is greater than the inertial mass of the single sector of the above-described first type shutter. Accordingly, a greater quantity of energy is required to effect 360° rotation of such two-sector shutter.

A third type is disclosed in British Pat. No. 1,061,605 or Japanese Patent Publication No. 22077/1964, of which the embodiment of FIG. 3 uses two sectors which are individually movable to form a slit with the aid of the time interval between the start of the leading curtain and that of the trailing curtain, as in the usual focal plane shutters. With such system, each sector must be returned to its original position during each shutter charge. More specifically, assuming that the two sectors each make a complete rotation, and if the trailing curtain starts at a point of time very much later than that of the leading curtain as in the slow-shutter or the bulb shutter, the leading curtain which has started earlier opens the shutter and further rotation of this curtain covers the picture plane independently of the trailing curtain. To avoid this, the leading curtain must be stopped at a predetermined angle of rotation, which presupposes the necessity of returning the sectors to their original positions as by winding operation after the completion of the shutter movement, thus sacrificing the ability of the mechanism to accelerate rapidly for continuous shooting as well as complicating the shutter construction.

SUMMARY OF THE INVENTION

We contribute, by our present invention, means whereby we are able to eliminate the above-noted disadvantages and to provide a one-way rotary shutter having a wide range of usefulness ranging from a high-speed shutter to a bulb shutter, and which can reduce the kinetic energy of the shutter and is suited for high-speed continuous shooting by eliminating the sector winding operation.

An important feature of the present invention involves a sector change-over mechanism which comprises a pair of semicircular or substantially semicircular sectors (hereinafter referred to as "semicircular sectors") mounted on drive shafts perpendicular thereto, one of which sectors covering the picture plane serves as a leading curtain while the other sector 180° out of phase with respect to the first sector serves as a trailing curtain, each of said sectors being rotatable through 180° in one direction to effect a shutter movement, thereby eliminating the necessity of returning the sectors to their original positions during each winding operation.

According to an embodiment of the present invention, we provide a rotary shutter mechanism of the mechanical control type which may comrpise a picture-taking opening, a substantially semicircular first sector and a substantially semicircular second sector for alternately covering the opening, first and second drive means charged by winding the camera's winding mechanism thereby to rotate the first and second sectors in one direction, first restraining means for restraining the first sector in its first position for covering the opening and in its second position, which is 180° out of phase with respect to the first position, second restraining means for restraining the second sector in its first position for covering the opening and in its second position, which is 180° out of phase with respect to its first position, first stop means for stopping the first sector in its first and second positions during each complete rotation thereof, second stop means for stopping the second sector in its first and second positions during each complete rotation thereof, and control means operatively associated with the camera's release mechanism to control the first and second restraining means so that upon release of the release mechanism one of the two restraining means which restrains one of the two sectors when in its first position is released to permit rotation of said one sector, and with a predetermined time delay thereafter, the other restraining means which restrains the other sector when in its second position is released to permit rotation of said other sector.

According to another embodiment of the present invention, we provide a rotary shutter mechanism of the electronic control type which may comprise a picture-taking opening, a substantially semicircular first sector and a substantially semicircular second sector for alternately covering the opening, first and second drive means charged by winding the camera's winding mechanism to rotate the first and second sectors in one direction, restraining means for restraining one of the sectors when in its first position for covering the opening while restraining the other sector when in its second position, which is 180° out of phase with respect to the first position, the restraining means being adapted to release its restraint upon release of the camera's release mechanism, first holding means for holding the first sector when in its second position, second holding means for holding the second sector when in its second position, means for controlling the first and second holding means so that upon release of the release mechanism, the restraint of the restraining means on the first and second sectors is released to rotate one of the sectors which is in its first position, and with a predetermined time delay thereafter, the holding means which is holding the other sector in its second position is released, and means operatively associated with the winding mechanism to change over the control means during each winding operation so that the control means controls one of the holding means which is associated with one of the sectors which is in its second position during the winding of the charge mechanism.

In any of these embodiments, each of the sectors may comprise a light-intercepting curtain member and a plurality of reinforcing frames extending radially of the curtain member and joined thereto.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
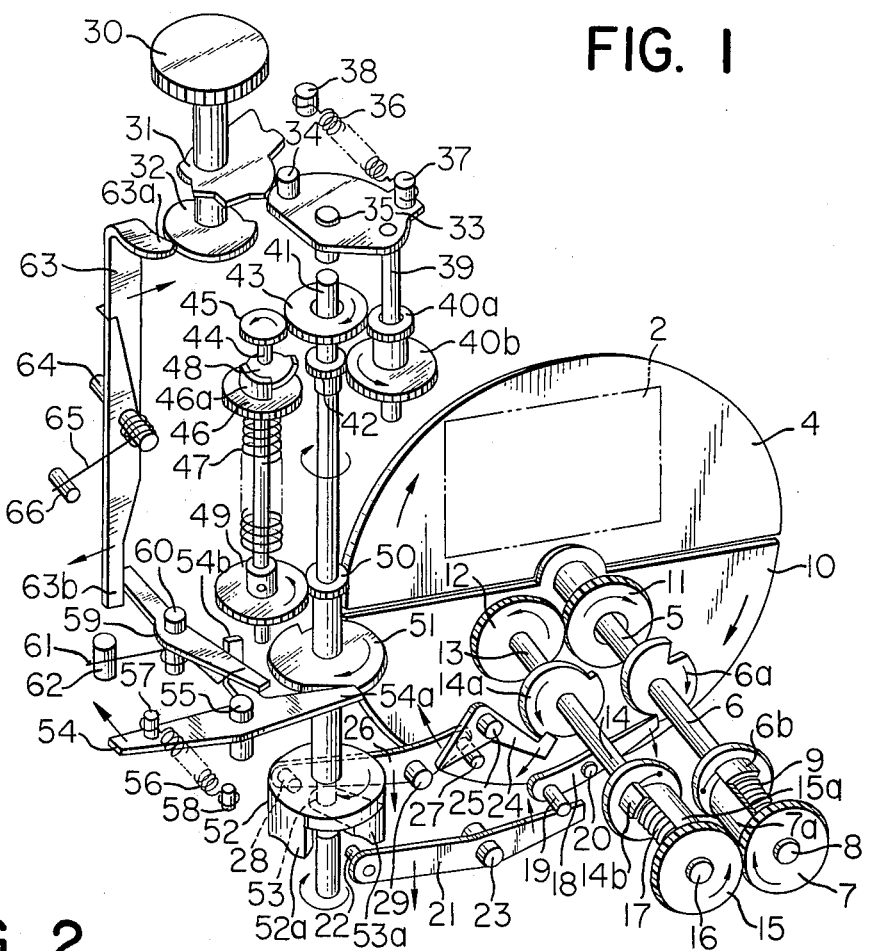
FIG. 1 is a perspective view of the mechanical control type rotary shutter mechanism according to a first embodiment of the present invention.
Figure 2:
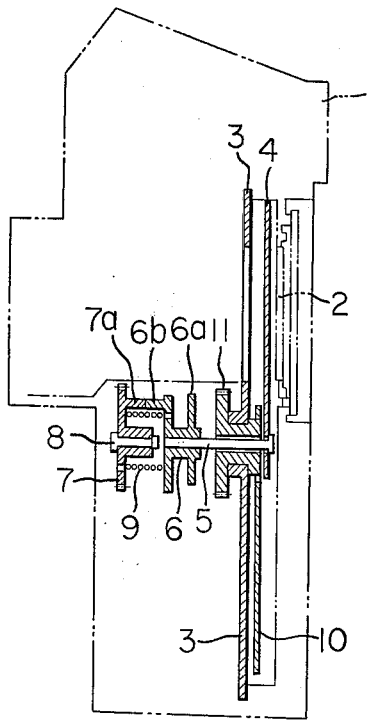
FIG. 2 is a vertical cross-section of the first sector drive shaft in the first embodiment.

Referring to FIGS. 1 to 4, there is shown a first embodiment of the present invention which is of the mechanical control type.

A camera body 1 (FIG. 2) has a picture-taking opening 2 formed therein, and a shutter case plate 3 having a picture-taking window and secured to the camera body 1. A substantially semi-circular first sector is designated by reference numeral 4 and is rotatable with a first sector drive shaft 5 having a first cam 6 securely mounted thereon. The first cam 6 has at one end a disc 6a formed with diametrically opposite notches, and at the other end a projected portion 6b.

A first sector spring charge gear 7 having a projected portion 7a engaged with the projected portion 6b is securely mounted on a first shaft 8 coaxial with the first sector drive shaft 5, and serves to charge a first sector drive spring 9 and also to control the angular rotation of the first sector 4 to 180° with the aid of the projected portions 6b and 7a. The first sector drive spring 9 has one end connected to the projected portion 6b of the first cam 6 and the other end connected to the first sector charge gear 7.

A second sector 10 is identical in configuration to the first sector. Gears 11 and 12 are provided to transmit movement to the second sector 10. As shown in FIG. 1, the gear 11 is integral with the second sector 10 and loosely mounted on the first sector shaft 5 while the gear 12 is securely mounted on a second sector drive shaft 13.

On the second sector drive shaft 13 and a second shaft 16, there is mounted a second cam 14, a second sector spring charge gear 15 and a second sector drive spring 17, which are all disposed symmetrically with those members mounted on the first sector drive shaft 5 and the first shaft 8. The second sector spring charge gear 15 meshes with the first sector spring charge gear 7 and is operatively associated with a winding system (not shown) provided in the camera body.

The first sector drive spring 9 and the sector drive spring 17 having capacities and spring constants selected such that their respective sectors effect a completely equal amount of movement in accordance with the inertial masses of the respective sector moving systems.

The first and second sector drive shafts 5 and 13 and the first and second shafts 8 and 16 are rotatably journalled to the shutter base plate 3 by means of unshown support plates, struts, etc.

As best shown in FIG. 1, a first sector restraining lever 18 has one end engageable with one of the notches in the disc 6a of the first cam and the other end having a pin 19 studded therein, and is biased by a spring (not shown) for counter-clockwise rotation about a pivot pin 20 fixed to the shutter case plate 3.

A first kick lever 21 has one end engageable with the underside of the pin 19 and the other end carrying a roller 22, and is biased by a spring (not shown) for clockwise rotation about a pivot pin 23 fixed to the shutter base plate 3. A second sector restraining lever 24 has one end engageable with one of the notches in the disc 14a of the second cam and the other end engageable with a pin 27 studded in a second kick lever 26 at one end thereof, and is biased by a spring (not shown) for counterclockwise rotation about a pivot pin 25 fixed to the shutter base plate 3. The second kick lever 26 has a roller 28 at its end opposite the pin 27, and is biased by a spring (not shown) for clockwise rotation about a pivot pin 29 fixed to the shuter base plate 3.

The first sector restraining lever 18 and the first kick lever 21 together constitute a member for releasing the first sector 4, and the second sector restraining lever 24 and the second kink lever 26 together constitute a member for releasing the second sector 10. A shutter dial is designated by 30, a governor cam by 31, and a bulb cam by 32. These cams are rotatable with the shutter dial 30, by reason of a common shaft 30a. A rotary plate 33 has a pin 34 engageable with the cam surface of the governor cam 31 and is biased by a spring 36 for counterclockwise rotation about a pivot pin 35 disposed coaxially with a controller shaft 41 which will later be described. The spring 36 has the opposite ends thereof secured to pins 37 and 38, one of which is studded in rotary plate 33. A planetary gear shaft 39 is mounted in the rotary plate 33 and loosely mounts thereon planetary gears 40a and 40b.

The controller shaft 41 supports a pinion 42, and a leading curtain kick member 53, later to be described, is secured to the lower portion of the shaft 41. A sun gear 43 is loosely mounted on the controller shaft 41 and serves to transmit rotational movement of a controller drive shaft 44 to the pinion 42 via the planetary gears 40a and 40b. A pinion 45 is securely mounted on the controller drive shaft 44. A charge gear 46 for charging a controller driving gear 49 has an upwardly projected portion 46a on its top surface, as viewed, and is loosely mounted on the controller drive shaft 44 and operatively associated with a winding system (not shown) provided in the camera body. A rotation limit ring 48 is securely mounted on the controller drive shaft 44 and engageable with the projected portion 46a of the charge gear 46 to limit the rotation of the controller shaft 41 to 180°. The controller drive spring 47 has one end secured to the charge gear 46 and the other end secured to the controller drive shaft 44. The gear 49 is securely mounted on the controller drive shaft 44 and meshes with a pinion 50 loosely mounted on the controller shaft 41. A restraining disc 51 is formed integrally with the pinion 50 and has two diametrically opposite notches engageable by one end of a release lever 54. A trailing curtain kick member 52, which is known as the member for controlling the release of a trailing curtain, is formed integrally with the pinion 50 and restraining disc 51 and has a downwardly projected portion 52a engageable with the rollers 28 and 22 on the second and first kick levers 26 and 21, respectively.

A leading curtain kick member 53, which is known as the member for controlling the release of a leading curtain, is securely mounted on the controller shaft 41 at the lower portion thereof and has an engaging portion 53a engageable with the rollers 22 and 28 on the first and second kick levers 21 and 26. The planetary gear 40a and the pinions 42, 50 and 45 all have the same number of teeth and the planetary gear 40b, the sun gear 43 and the gear 49 all have the same number of teeth, and these together constitute a differential gearing arrangement.

A release lever 54 is connected to a release system (not shown) and one end 54a of this lever is engageable with one of the notches in the restraining disc 51. The lever 54 is biased by a spring 56 for counter-clockwise rotation about a pivot pin 55 fixed to the shutter base plate 3, the spring having opposite ends thereof secured to pins 57 and 58, one of which is studded in release lever 54.

A bulb lever 59 is biased by a spring 61 for counterclockwise rotation about a pivot pin 60 fixed to the shutter base plate 3, the spring having one end secured to a pin 62 and the other end to the lever 59. This bulb lever 59 has one end engageable with one end 54b of the release lever 54 and the other end engageable with one end 63b of a bulb cam lever which will later be described.

A bulb cam lever 63 is biased by a spring 65 for clockwise rotation about a pivot pin 64 fixed to the shutter base plate 3, one end of the spring 65 engaging a pin 66 and the other end engaging the lever 63, as shown. The bulb cam lever has one end 63a engageable with the bulb cam 32.

Actual shutter movement will now be described.

It is assumed that each of the sector drive springs 9, 17 and controller drive springs 47 has been charged by a winding system (not shown).

A camera's release button (not shown) is depressed to rotate the release lever 54 in the direction of its arrow (FIG. 1), thereby disengaging one end 54a thereof from the restraining disc 51, whereupon the spring force of the controller drive spring 47 is transmitted through the gear 49 to the pinion 50 to rotate the trailing curtain kick member 52 in the direction of its arrow and at the same time, spring force is likewise transmitted through the controller drive shaft 44, the pinion 45, the sun gear 43 and the planetary gears 40a, 40b to the pinion 42 to rotate the leading curtain kick member 53 in the same manner.

Since, as already described, the planetary gears 40a and the pinions 42, 45, 50 have the same number of teeth and the planetary gear 40b, the sun gear 43 and the gear 49 have the same number of teeth, the leading curtain kick member 53 and the trailing curtain kick member 52 are rotated similarly and in unison.

Figure 3:
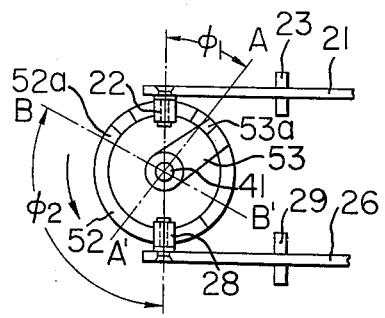
FIG. 3 diagrammatically illustrates the relationship between the leading and trailing curtains in the first embodiment.

In FIG. 3, as the controller shaft 41 is rotated from its position A through an angle of $\phi_1$, the engaging portion 53a of the leading curtain kick member strikes against the roller 22 of the first kick lever 21 to rotate the lever 21 in the direction of its arrow (FIG. 1).

This in turn shifts the first sector restraining lever 18 out of engagement with the disc 6a of the first cam 6, thereby permitting the first sector shaft 5 to be rotated clockwise by the first sector drive spring 9. As a result, the first sector 4 is rotated clockwise to open the shutter.

Likewise, as shown in FIG. 3, the controller shaft 41 is further rotated from its position B through an angle of $\phi_2$, whereby the projected portion 52a of the trailing curtain kick member depresses the roller 28 of the second kick lever 26 to bring the second sector restraining lever 24 out of engagement with the disc 14a of the second cam 14 to permit the second sector shaft 13 to be rotated counterclockwise by the second sector drive spring 17, so that the second sector 10 is rotated clockwise through the agency of the gears 12, 11 to close the shutter.

When the sector drive shafts 5 and 13 have each been rotated through 180°, the projections 6b and 14b of their respective cams strike against the projected portions 7a and 15a of the respective sector spring charge gears, thereby stopping the respective sector drive shafts.

Figure 4:
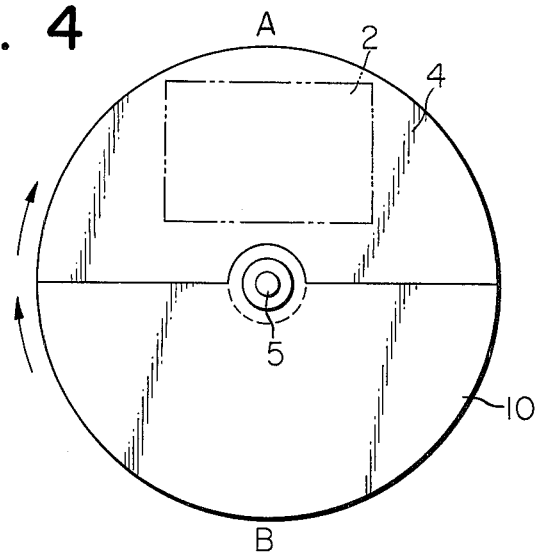
FIG. 4 schematically illustrates the relative position of the two sectors in the first embodiment.

Thus, as seen in FIG. 4, the first sector 4 has been displaced from its position A to its position B while the second sector 10 has been displaced from its position B to its position A.

On the other hand, the controller shaft 41 is also stopped at a position where the rotation limit ring 48 integral with the pinion 45 has rotated through 180° to strike against the projected portion 46a of the charge gear.

In FIG. 3, this condition means that the engaging portion 53a of the leading curtain kick member has shifted through 180° from the position A to the position A' while the projected portion 52a of the trailing curtain kick member has shifted through 180° from the position B to the position B'.

When the winding is then effected, the charge gear 46 charges the controller drive spring 47 to a predetermined amount while the sector spring charge gears 7 and 15 charge the respective sector drive springs 9 and 17 to a predetermined amount.

During that time, the sectors 4, 10 and the controlling shaft 41 are restrained from rotating by the sector restraining levers 18, 24 and the release lever 54, respectively.

When release is again effected, the engaging portion 53a of the leading curtain kick member 53 on the controller shaft 41 starts from the position A' in FIG. 3 to release the second sector drive shaft 13 while the projected portion 52a of the trailing curtain kick member 52 starts from the position B' to release the first sector drive shaft 5, thus permitting the sectors 4 and 10 to start in the order opposite to the previous one. In other words, the second sector 10 now starts as the leading curtain, and then the first sector 4 starts as the trailing curtain.

In this way, the two sectors alternatelky change their relationship as leading and trailing curtains in accordance with the phase of the controller shaft, thereby achieving shutter operation.

The governor mechanism for the shutter will now be described. In FIG. 3, the time interval between the angles of rotation $\phi_1$ and $\phi_2$ of the controller shaft 41 corresponds to the shutter speed.

The governor system adopted in the present embodiment is of the type in which the angle of rotation $100_2$ for the point of time at which the trailing curtain is released is fixed; and the point of time at which the leading curtain is released is governed by the planetary gearing arrangement.

Rotation of the shutter dial 39 causes the governor cam 31 to rotate the rotary plate 33 about the shaft 35 or about the controller shaft 41. This rotation in turn causes the planetary gears 40a and 40b to rotate about their own axes while revolving around the sun gear 43 and the pinion 42, respectively. Since the sun gear 43 is restrained from rotating by the rotational force of the controller drive spring 47 and by the release lever 54, the controller shaft 41 is rotated through the agency of the pinion 42. Thus, the angle of rotation $\phi$ is varied to change the shutter speed.

Although not shown in the present embodiment, it is possible to bring a conventional governor into and out of engagement with the controller shaft to change the rotational speed and thus the time interval between the angles of rotation $\phi_1$ and $\phi_2$, thereby providing a low-speed shutter, especially.

Further, the present embodiment has been described as employing a planetary gearing arrangement, whereas other suitable governor mechanism for varying the angle of rotation $\phi_1$ or $\phi_2$ may equally be employed.

When the shutter dial is set to the bulb, one end 63a of the bulb cam lever 63 is received in the recessed portion of the bulb cam 32 while the other end 63b of the bulb cam lever 63 liberates the bulb cam lever 59 to permit it to rotate clockwise. However, the tendency of the lever 59 toward rotation is blocked by one end 54b of the release lever 54. When the shutter button is then depressed to rotate the release lever 54 in the direction of its arrow, another end 54a of this lever is disengaged from a notch in the restraining disc 51 to permit rotation of the controller shaft 41. In the manner described, the engaging portion 53a of the leading curtain kick member 53 now starts one of the sectors to open the shutter. The trailing curtain kick member 52 is also rotated, but before the projected portion 52a thereof kicks the roller of one of the kick levers, the bulb lever 59 is rotated counter-clockwise to bring one end 59 thereof into engagement with a notch of the restraining disc 51 to prevent rotation of the controller shaft 41 and accordingly rotation of that sector which provides the trailing curtain. As a result, the shutter remains open. In this case, the design is made to satisfy the relation that $\phi_2 > \phi_3 > \phi_1$, where $\phi_3$ is the angle of rotation provided until the rotation of the controller shaft 41, i.e., the restraining disc 51 is blocked by the bulb lever 59. Now, when the release is terminated, the release lever 54 is returned to its original position by the action of the spring 56 and at the same time, the engagement between the lever 59 and the restraining disc 51 is broken to permit the controller shaft 41 to resume its rotation so that the trailing curtain is released by the projected portion 52a of the trailing curtain kick member, thus closing the shutter.

Figure 5:
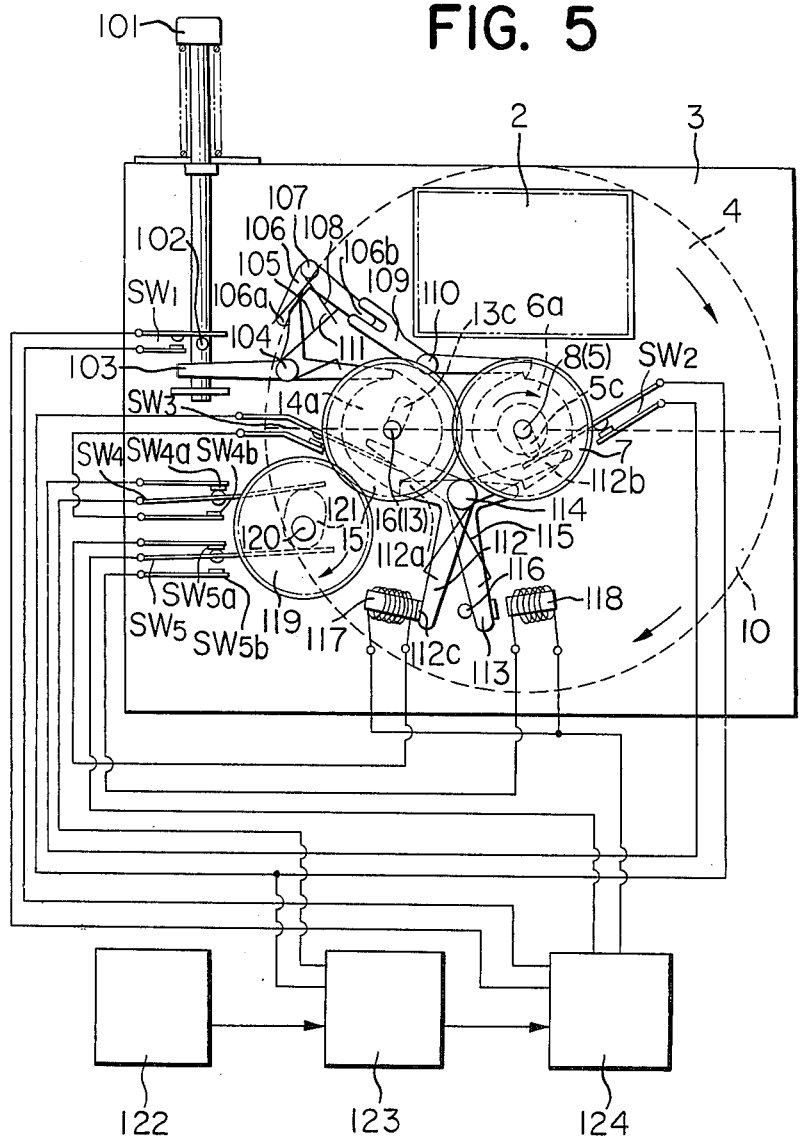
FIG. 5 illustrates the electronic control type rotary shutter mechanism according to a second embodiment of the present invention.

FIG. 5 shows a second embodiment of the present invention which employs an electronic control system.

Those members given the reference numerals 1 to 17 in the first embodiment apply to like parts in the second embodiment.

Referring to FIG. 5, the first and second sector drive shafts 5 and 13 respectively have insluating cams 5c and 13c securely mounted thereon. An insulating pin 102 is fixed to release button 101. A second release lever 103 is biased by one end of a spring 105 for clockwise rotation about a pivot pin 104 fixed to the shutter base plate 3. A connecting lever 106 is biased by one end of a spring 108 for counter-clockwise rotation about a pivot pin 107 also fixed to the shutter base plate 3; and a first release lever 109 is pivotally mounted on a pivot pin 110 also fixed to the shutter base plate 3. The two springs 105 and 108 have their respective other ends secured to a pin 111.

The pin 102 is engageable with one contact of a start switch SW1 and with the second relase lever 103, which has one end engageable with a pin 106a studded in the connecting lever 106, and has two other ends engageable with the pin 102 and the disc portion 14a of the second cam, respectively. The first release lever 109 has one end engageable with another pin 106b studded in the connected lever 106 and the other end engageable with a notch in the disc portion 6a of the first cam to restrain the same. The first and second release levers 109, 103 and the connecting lever 106 together constitute a restraining member which may restrain the two sectors and be released by a release system. A second iron lever 112 is biased by a spring 115 for counterclockwise rotation about a pivot pin 114 fixed to the shutter base plate 3, and has one end 112a engageable with a notch in the disc portion 14a of the second cam and the other end 112b engageable with the cam 5c on the first sector drive shaft 5. A first iron lever 113 is provided and constructed symmetrically with the second iron lever 112. The pin 114 and the spring 115 also serve the first iron lever 113. A limit pin 116 is provided for the two iron levers. Second and first electromagnets 117 and 118 are disposed in opposed relationship with the second and first iron levers 112 and 113, respectively. The second electromagnet 117 serves to attract one end 112c of the second iron lever 112.

A charge gear 119 meshes with the second sector spring charge gear 15 and is rotatable through 180° about a shaft 120 by a single winding operation. A cam 121 is formed integrally with the charge gear 119 and is engaged with two sets of change-over switches SW4 and SW5. There is further seen a conventional power source circuit 112, a time constant circuit 123, to be described, and a conventional switching circuit 124. The start switch SW1 may be closed by the pin 102 upon depression of the release button 101 to pass a current for energizing the electromagnets 117 and 118 prior to the occurrence of release. Switches SW2 and SW3 are time constant circuit start switches opened and closed by the cams 5c and 13c securely mounted on the sector drive shafts 5 and 13, respectively, and the opening of these switches SW2 and SW3 serves to start the time constant circuit 123. The change-over switch SW4 acts alternately to connect the time constant circuit start switches SW2 and SW3 to the time constant circuit 123 with the aid of the cam 121 on the charge gear 119. Like the change-over switch SW4, the change-over switch SW5 acts alternately to connect the two electromagnets 117 and 118 to the switching circuit 124. These switches and electromagnets are connected to the respective circuits 123 and 124, in the manner as shown in FIG. 5.

Actual shutter movement will now be described. In the position of FIG. 5, it is assumed that the first and second sector drive springs have been charged.

Depression of the release button 101 closes the start switch SW1. The closing signal passes to the switching circuit 124, thus permitting flow of a current to the electromagnets. At this time, the change-over switch SW5 is closed at one of its contacts SW5a, so that the second electromagnet 117 alone is energized. Also, the second iron lever 112 is urged into engagement with the second electromagnet 117 by the cam 5c on the first sector drive shaft 5, against the force of the spring 115, prior to release operation.

Continued depression of the release button 101 causes the pin 102 to rotate the second and first release levers 103 and 109 in counter-clockwise direction, as a result of which these release levers are disengaged from the notches of the respective disc portions 6a and 14a. By that time, the first iron lever 113 will already have been disengaged from the disc portion 6a of the first cam and the second iron lever 112 will already have been engaged with the disc portion 14a of the second cam to restrain the same, so that the first sector drive shaft 5 alone is rotated clockwise to open the shutter.

With the rotation of the first sector drive shaft 5 in the direction of its arrow, the cam 5c escapes from one end 112b of the second iron lever 112, which is thus ready for counter-clockwise rotation but is not yet rotatable because the second electromagnet 117 is still energized. At the same time, the cam 5c opens the time constant circuit start switch SW2. This opening of the switch SW2 permits a signal to pass to the time constant circuit 123 to operate the same. On the other hand, the time constant circuit start switch SW3 has nothing to do since the change-over switch SW4 remains open at one of its contacts SW4b. The time constant circuit 123 applies a signal to the switching circuit 124 for deenergizing the electromagnet when a proper shutter speed has been attained in accordance with such factors as brightness of the object to be photographed, film sensitivity, lens aperture value, etc. or when a manually set shutter speed has been electromagnet 117, the second iron lever 112 is rotated counter-clockwise by the spring 115 to disengage one end 112a thereof from a notch in the disc portion 14a of the second cam, thereby permitting counter-clockwise rotation of the second sector drive shaft 13 and closing of the shutter. As in the first embodiment, the first and second sectors are thus rotated through 180° to come to a halt.

At this moment, the cam 13c on the second sector drive shaft 13 assumes a position 180° out of phase with respect to its position shown in FIG. 5, to close the time constant circuit start switch SW3 and also to rotate the first iron lever 113 in counter-clockwise direction, thus urging this lever 113 into engagement with the first electromagnet 118.

When winding is then effected, the charge gear 119 is rotated in the direction of its arrow to rotate the first and second sector spring charge gears 7 and 15, which charge the first and second sector drive springs, respectively. Rotation of the charge gear 119 through 180° causes the cam 121 to assume a position 180° out of phase with respect to its position shown in FIG. 5, thereby shifting the changeover switches SW4 and SW5 to their contacts SW4b and SW5b, respectively.

When the shutter button 101 is again depressed to take a picture, the first electromagnet 118 is now energized instead of the second one, so that the first sector 4 is held to permit the second sector 10 to start as the leading curtain, thereby opening the time constant circuit start switch SW3. This opening of the switch SW3 causes energization of the time constant circuit 123, which is thus operative to close the shutter after a certain time interval with the first sector 4 as the trailing curtain.

Thus, in accordance with the phase of the cam 121 operatively associated with the charge gear 119, the circuit is alternatively changed over between the time constant circuit start switches SW2, SW3 and the electromagnets 117, 118 alternately to change the relationship of the two sectors as the leading and trailing curtains, thus achieving shutter operation.

The above-described first and second embodiments have both used depression of the release button to release the sectors from restraint, but some design modifications may readily be made so as to permit the sectors to be released from restraint by the upward movement of the mirror in a single-lens reflex camera.

Further, in the second embodiment, the iron levers have been described as being mechanially urged into and out of engagement with the respective electromagnets by the cams mounted on the respective sector drive shafts, whereas design modifications can be made such that, as in the ordinary electronic shutter type cameras, the iron levers are urged into engagement with the respective electromagnets by the winding mechanism and released from mechanical restraint by a member operable prior to the movement of the leading shutter curtain (for example, the controller shaft shown in FIG. 1).

The present invention uses two semicircular rotary sectors to reduce the inertial mass and accordingly the acceleration energy and rotational torque of the sectors. A smaller thickness of the sector results in a lower inertial mass, but too small a thickness would offer a problem in respect of sector strength.

Figure 6:
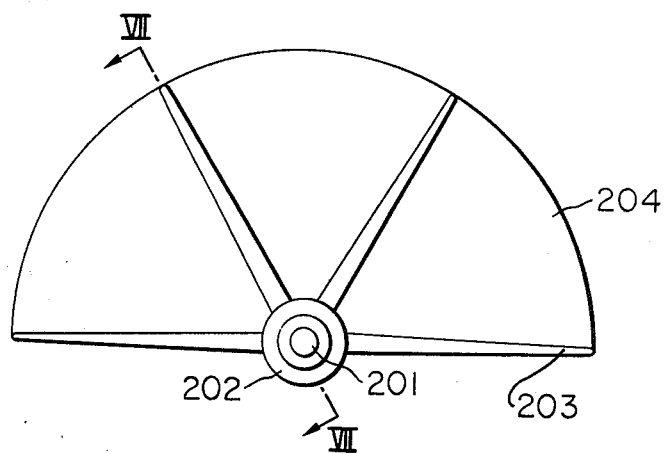
FIG. 6 is a front view showing a form of sector suitable for use in the embodiments of the present invention.
Figure 7:
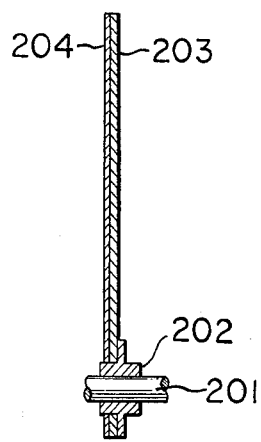
FIG. 7 is a sectional view taken along line VII-VII' of FIG. 6.

FIGS. 6 and 7 show a form of the sector which can reduce its inertial mass without sacrificing its strength In these Figs. reference numeral 201 designates a sector drive shaft, 202 a boss for uniting a thin curtain member 204 integrally with the shaft 201, and 203 a plurality of reinforcing frames.

The present invention which, as has been described hitherto, rotates two substantially seemicircular sectors through 180° independently of each other to change over their relationship as leading and trailing curtains, can positively provide a shutter which is operable over a wider range than the existing rotary shutter, i.e., from high speed to low speed and bulb, simply by moving the two sectors as a certain time interval.

It will also be understood that, since the kinetic energy required of the shutter is equivalent to that required to rotate a single semicircular sector, it is smaller than the kinetic energy required of the existing rotary shutter, and this means a smaller force required for winding. Moreover, during winding, the necessity for each sector to return to its original position is eliminated and it is only the sector drive springs which must be charged; therefore the winding mechanism can be simplified and in addition, the frame movement can be accelerated during continuous shooting operations using a motor drive or the like.

Additionally, in the first embodiment, these effects may be achieved by a very much simplified mechanism inasmuch as the members for releasing the respective sectors are disposed out of phase with each other an amount equal to the angle of rotation (180°) of the controller shaft so that the leading and trailing curtain kick members mounted on the controller shaft alternately change the relationship of the two sectors as the leading and trailing curtains and the change of the relative position of the two kick members and the control of the movement of the controller shaft alternately change the relationship of the two sectors as the leading and trailing curtains and the change of the relative position of the two kick members and the control of the movement of the controller shaft is effected through the agency of the shutter dial.

Also, the embodiment illustrated in FIG. 5 enables the existing electronic control circuit in the electronic control circuit in the electronic shutter type camera to be utilized without any other complicated mechanism being added thereto, thus providing a shutter of the electronic control type.

We believe that the construction and operation of our novel rotary shutter mechanism will now be understood, and that the advantages thereof will be fully appreciated by those persons skilled in the art.

We claim:

1. A rotary shutter mechanism for a camera having a winding mechanism and a release mechanism, said rotary shutter mechanism comprising:

a. a picture-taking opening (2);
   b. a substantially semicircular first sector (4) and a substantially semicircular second sector (10) for alternately covering said opening;
   c. first (5–9) and second (13–17) drive means charged by winding said winding mechanism to rotate said first and second sectors 180° only in one direction;
   d. first restraining means (18, 21, 6a) normally restraining said first sector in its first position for covering said opening and in its second position which is 180° out of phase with respect to the first position;
   e. second restraining means (24, 26, 14a) normally restraining said second sector in its first position for covering said opening and in its second position which is 180° out of phase with respect to the first position;
   f. first stop means (6b, 7a) for stopping said first sector in its first and second positions during each complete rotation thereof;
   g. second stop means (14b, 15a) for stopping said second sector in its first and second positions during each complete rotation thereof; and
   h. control means operatively associated with said release mechanism to control said first and second restraining means so that upon release mechanism one of said two restraining means is released from its normal position restraining one of said sectors in its first position to permit rotation of said one sector until its stoppage in second position by one of said two stop means, and after predetermined time delay, the other restraining means is released from its normal position restraining the other sector in its second position to permit rotation of said other sector until its stoppage in its first position by the other stop means.

2. A rotary shutter mechanism according to claim 1, wherein said control means comprises:

a leading sector release member (53a) for releasing one of said two restraining means from a position restraining one of said first and second sectors when in its first position;
   a trailing sector release member (52a) for releasing the other restraining means from a position restraining the other sector when in its second position; and
   control means for rotating said leading and trailing sector release members as a unit and changing their relative positions.

3. A rotary shutter mechanism according to claim 2, wherein said leading and trailing sector release members are rotatable in a common circular path, said first restraining means has a portion (22) engagable with said two release members, said second restraining means has a portion (28) engagable with said two release members and said two portions are disposed 180° out of phase with respect to each other in said circular path.

4. A rotary shutter mechanism according to claim 1, wherein said first and second sectors each comprise a light-intercepting curtain member (2, 4) and a plurality of reinforcing means (203) extending radially of said curtain member and joined thereto.

5. A rotary shutter mechanism for a camera having a winding mechanism and a release mechanism, said rotary shutter mechanism comprising:

a. a picture-taking opening (2);

b. a substantially semicircular first section (4) and a substantially semicircular second sector (10) for alternately covering said opening;

c. first (5-9) and second (13-17) drive means charged by winding said winding mechanism to rotate said first and second sectors only in one direction;

d. restraining means (103-111) for restraining one of said sectors when in its first position covering said opening while restraining the other sector when in its second position restraining means being adapted to release its restraint upon 180° out of phase with respect to said first position;

e. first holding means (113, 118) normally holding said first sector when in its second position;

f. second holding means (112, 117) normally holding said second sector when in its second position;

g. means (122, 123, 124, SW2, SW3, SW4, SW4a, SW4b, SW5, SW5a, SW5b, 5c, 13c) for controlling said first and second holding means so that upon release of said release mechanism, the restraint of said restraining means on said first and second sectors is released to rotate one of said sectors which is in its first position, and after a predetermined time delay releasing said holding means holding the other sector in its second position; and h. means (120, 121, SW4, SW5) operatively associated with said winding mechanism to change over said control means during each winding operation so that said control means controls one of said holding means which is associated with one of said sectors in its second position during the winding of said winding mechanism.

6. A rotary shutter mechanism according to claim 5, wherein said first and second sectors each comprise a light-intercepting curtain member (2, 4) and a plurality of reinforcing means (203) extending radially of said curtain menber and joined thereto.

* * * * *

UNITED STATES PATENT OFFICE
CERTIFICATE OF CORRECTION

Patent No. 3,945,027  Dated March 16, 1976

Inventor(s) SHUJI KIMURA, et al.

It is certified that error appears in the above-identified patent and that said Letters Patent are hereby corrected as shown below:

Column 5, line 10, change "kink" to -- kick --.
Column 6, line 22, change "springs 47" to -- spring 47 --.
Column 7, line 38, change "alternatelky" to -- alternately --; line 47, change "$100_2$" to -- $\phi_2$ --.
Column 10, line 15, after "has been" insert -- attained. When thus released from the second --.
Column 11, line 20, change "seemicircular" to -- semicircular --.
Column 12, line 27, after "release" insert -- of said release --.
Column 13, line 1, change "section" to -- sector --; lines 11 and 12, delete "restraining means . . . restraint upon".

Signed and Sealed this

Sixth Day of July 1976

[SEAL]

Attest:

RUTH C. MASON
Attesting Officer

C. MARSHALL DANN
Commissioner of Patents and Trademarks